April 7, 1931.   H. G. DAVIS   1,799,357
METHOD AND APPARATUS FOR MAKING PAPER VESSELS
Filed Aug. 7, 1925   8 Sheets-Sheet 2

WITNESS:

INVENTOR
Harry G. Davis
BY
ATTORNEYS.

April 7, 1931. H. G. DAVIS 1,799,357
METHOD AND APPARATUS FOR MAKING PAPER VESSELS
Filed Aug. 7, 1925 8 Sheets-Sheet 3

WITNESS:

INVENTOR
Harry G. Davis
BY
ATTORNEYS.

April 7, 1931.   H. G. DAVIS   1,799,357
METHOD AND APPARATUS FOR MAKING PAPER VESSELS
Filed Aug. 7, 1925   8 Sheets-Sheet 4
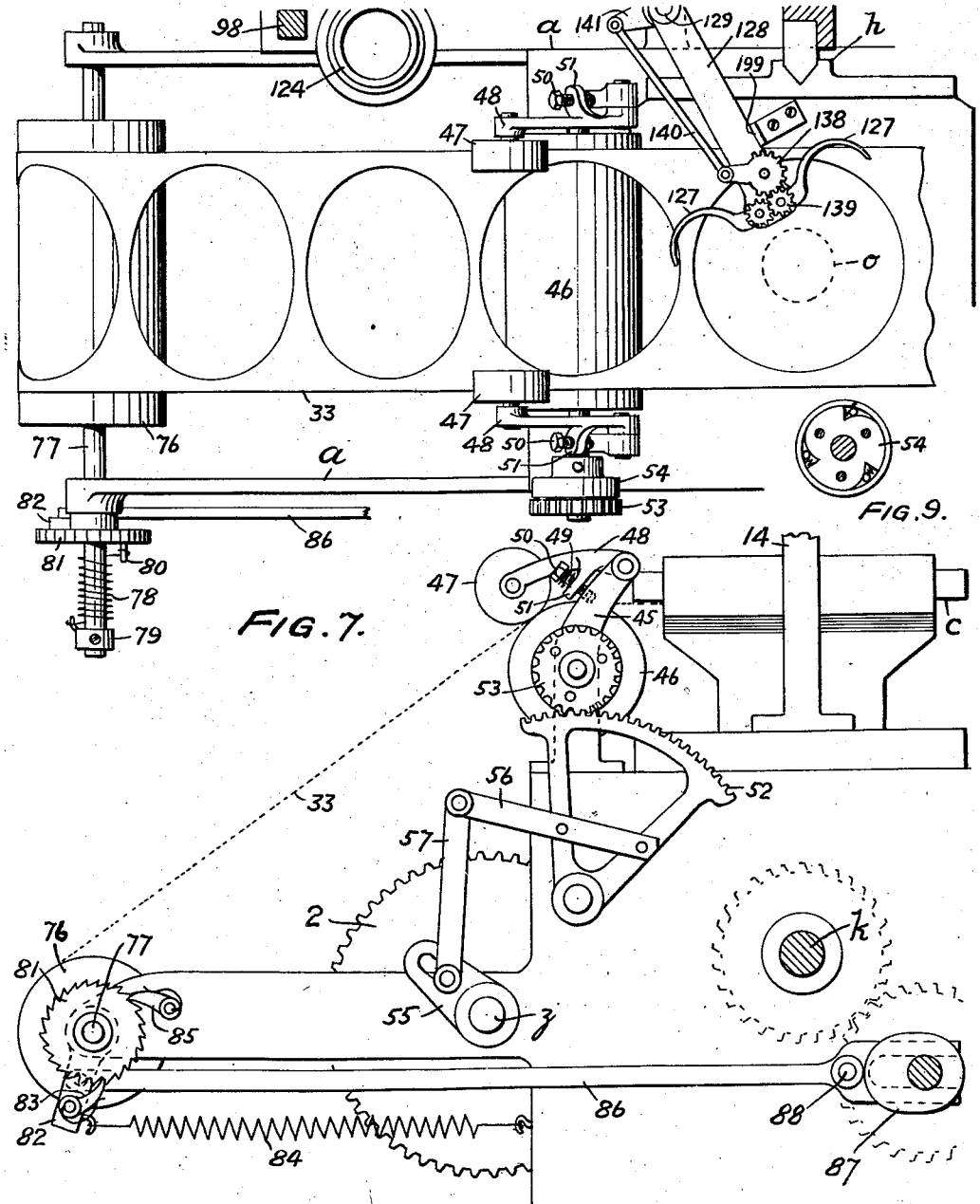
INVENTOR
Harry G. Davis
BY
ATTORNEYS.
WITNESS:

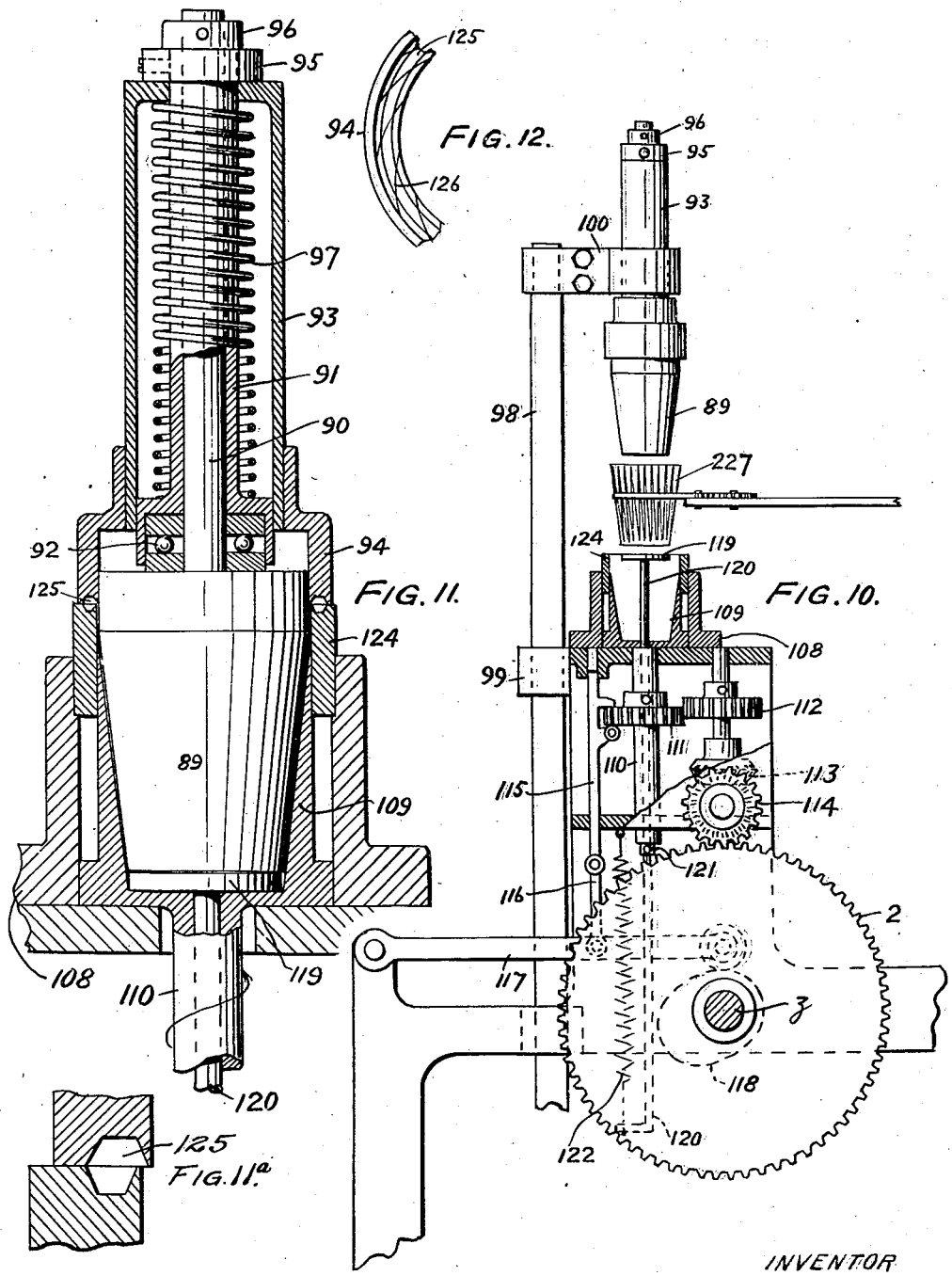

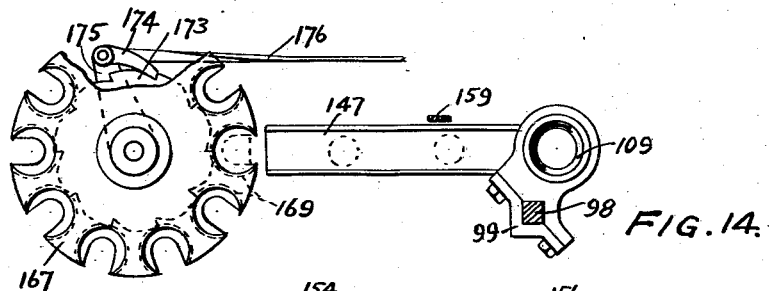
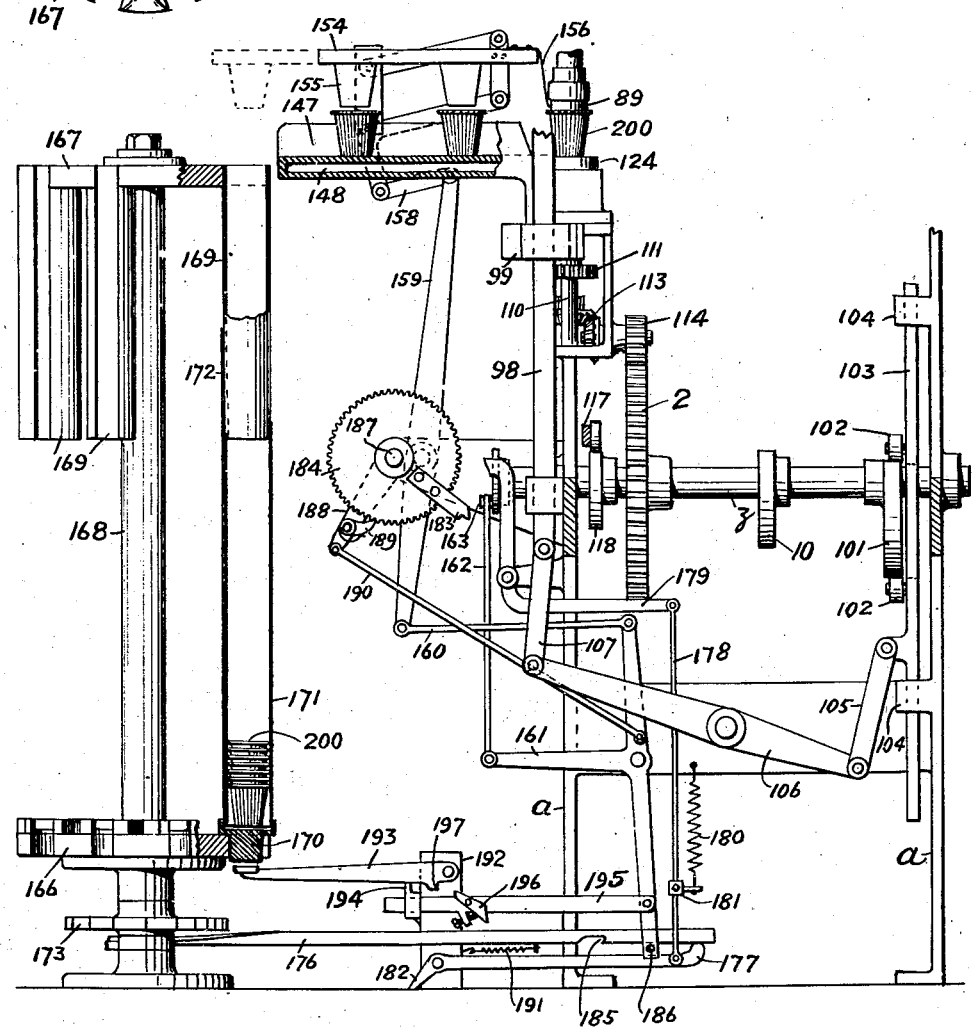
FIG. 14.
FIG. 13.

April 7, 1931.   H. G. DAVIS   1,799,357
METHOD AND APPARATUS FOR MAKING PAPER VESSELS
Filed Aug. 7, 1925   8 Sheets-Sheet 7
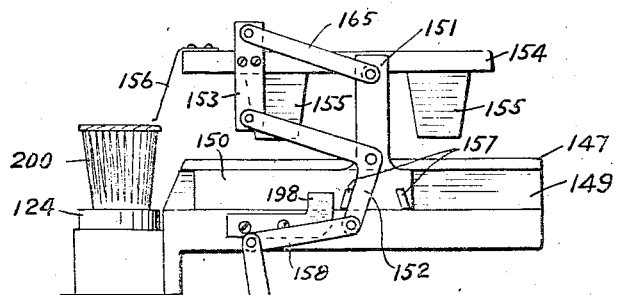
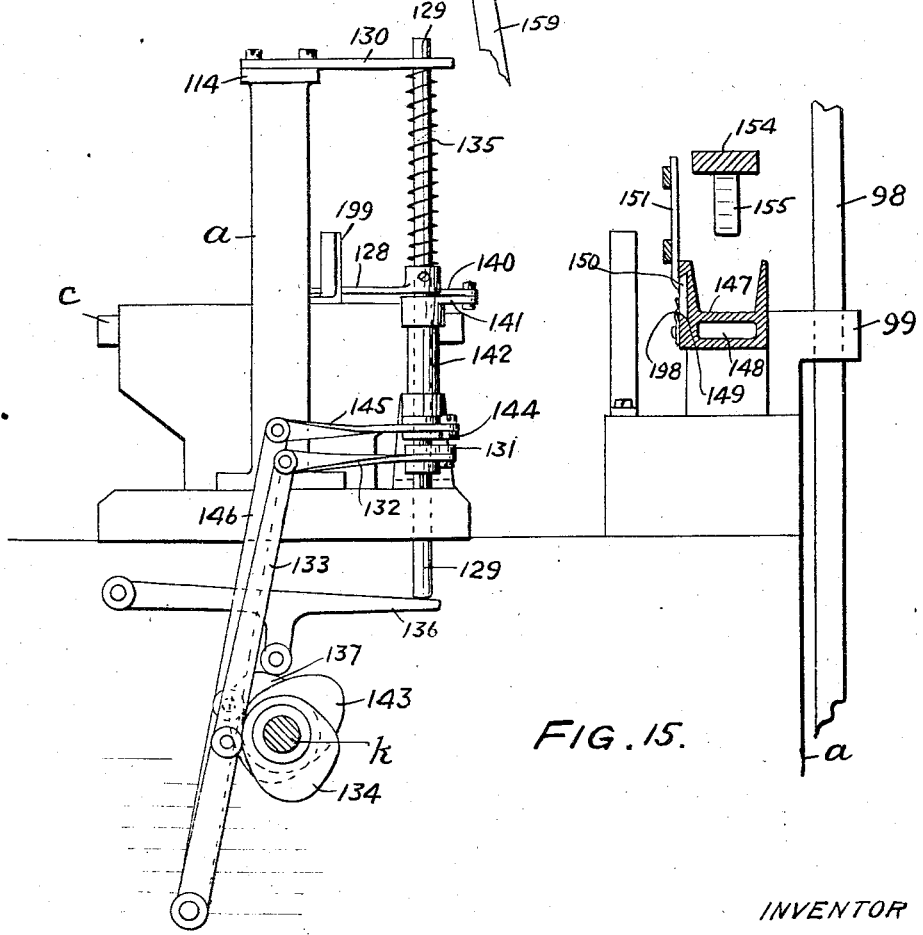
INVENTOR
*Harry G. Davis*
BY
*Bauer + Harding*
ATTORNEYS.

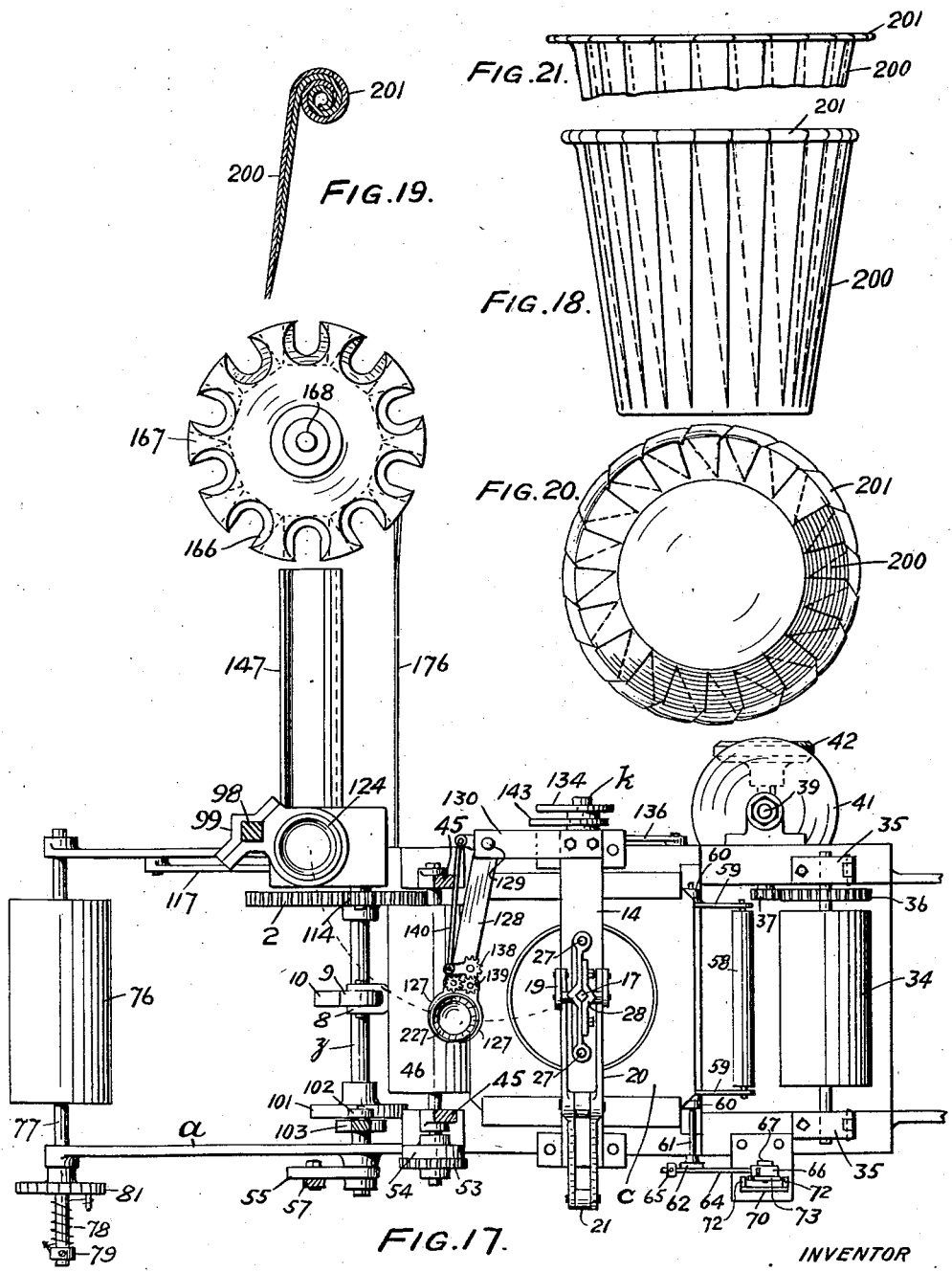

Patented Apr. 7, 1931

1,799,357

UNITED STATES PATENT OFFICE

HARRY G. DAVIS, OF PHILADELPHIA, PENNSYLVANIA, ASSIGNOR, BY MESNE ASSIGNMENTS, TO LILY-TULIP CUP CORPORATION, OF NEW YORK, N. Y., A CORPORATION OF DELAWARE

METHOD AND APPARATUS FOR MAKING PAPER VESSELS

Application filed August 7, 1925. Serial No. 48,717.

My invention relates to paper or fibre vessels such, for example, as paper drinking cups, methods of making the same, and improved apparatus for the production thereof.

Heretofore various methods, machines and apparatus have been provided for the production of paper vessels, but none of such machines have been capable of producing and packaging paper vessels wholly automatically and have been open to objection as inaccurate and relatively slow in operation.

Furthermore, the paper cups as heretofore made have not been wholly satisfactory and it is one of the objects of the present invention to produce a cup which will be of an improved and wholly satisfactory character.

Another object of my invention is to provide a method and a machine by which paper vessels, and more particularly paper drinking cups, may be produced and packaged wholly automatically without necessity for handling, it being only necessary to provide a supply of paper stock to the machine and to remove and seal the packages of completed cups.

Further objects of my invention, as will appear from the detailed description hereinafter contained, are to provide a machine composed of devices novel in themselves and in combination, and at the same time a machine of relative simplicity, which will perform the several operations incidental to the production of paper vessels, as drinking cups and the like, with a high degree of accuracy and speed and with the production of substantially no seconds; and further, a machine which will require a minimum of adjustment and be substantially foolproof, requiring for its successful operation, only such attention as is required to renew the supply of paper stock and remove the packaged product.

Having indicated, in a general way, the nature and purpose of my invention, I will proceed to a detailed description thereof, with reference to the accompanying drawings in which has been illustrated a machine embodying my invention and in detail the several elements thereof, the combination of which comprises a preferred embodiment of my invention, and in which—

Fig. 7 is a plan view of a part of the machine showing details of the paper feed and scrap take-up mechanism.

Fig. 8 is a side view of the showing of Fig. 7.

Fig. 9 is a detail view of a clutch incorporated in the feed.

Fig. 10 is a sectional view of the cup finishing mechanism.

Fig. 11 is a detail sectional view of the cup finishing mechanism.

Fig. 11$^a$ is an enlarged fragmentary section of a portion of said cup finishing mechanism.

Fig. 12 is an enlarged view of a detail of the cup finishing mechanism.

Fig. 13 is a view, partly broken away, showing the cup discharge, counting and packaging devices with relation to the finishing device.

Fig. 14 is a plan view of a part of the discharge, counting and packaging devices shown in Fig. 13.

Figure 1:
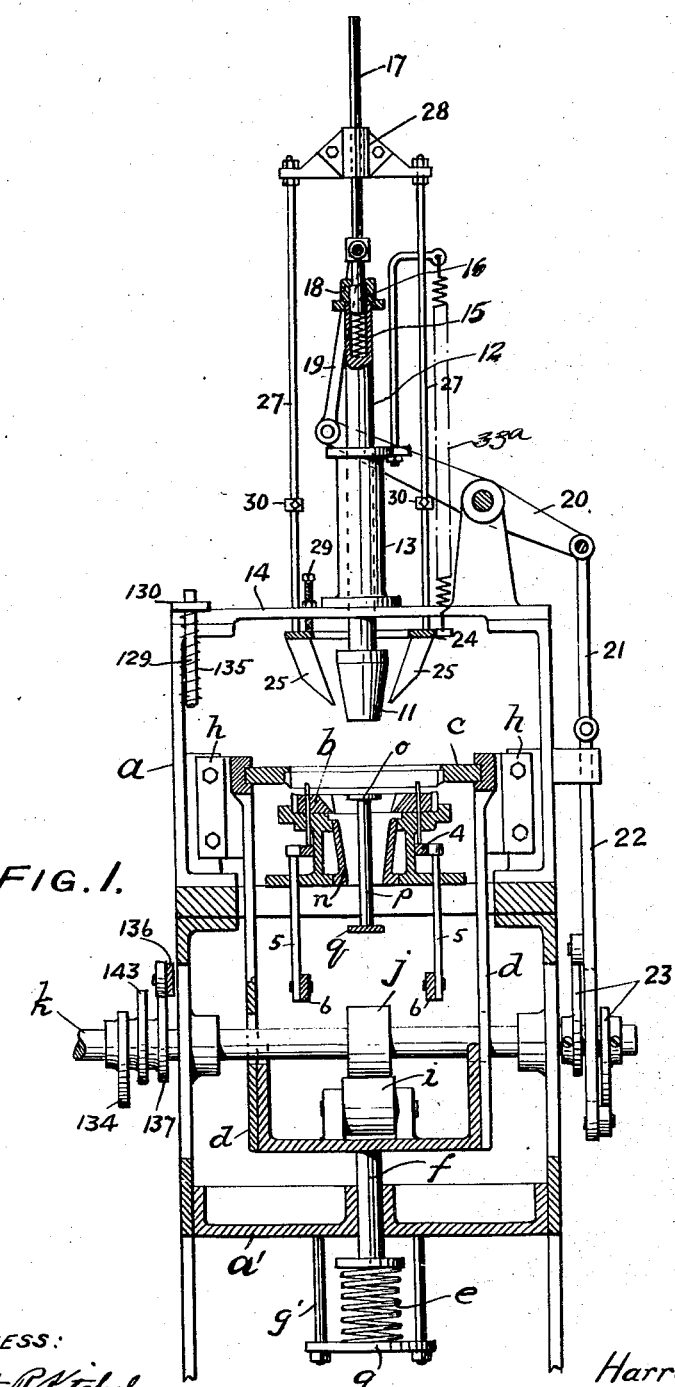
Fig. 1 is a vertical section of a part of the machine embodying my invention, showing the blanking and folding devices.

Fig. 15 is a side view, partly in section, looking at the left side of Fig. 1 and showing details of the cup transfer and discharge mechanism.

Fig. 16 is a partial view in elevation showing details of the discharge mechanism shown in Fig. 13, as viewed from the opposite direction.

Fig. 17 is a general plan view of the complete machine embodying my invention, showing the combination of parts illustrated in detail in Figs. 1–16.

Fig. 18 is a view of a finished cup as produced by the machine embodying my invention.

Fig. 19 is an enlarged detail section of the rim of the cup.

Fig. 20 is a bottom view of the cup; and

Fig. 21 is a side elevation of the same cup after it has received a further treatment.

The machine as illustrated comprises, in its complete organization, a number of novel elements which, arranged in combination, operate for the production and packaging of the product and which, for clarity and more full understanding of the machine as a whole, will be described in detail separately.

The machine consists essentially in:
Blanking mechanism.
Forming or folding mechanism.
Feeding and take-up mechanism.
Finishing or spinning mechanism.
Transferring mechanism.
Discharge, packaging and counting mechanism.

Blanking mechanism

The blanking mechanism is mounted on the main frame $a$ of the machine and comprises a fixed circular die $b$, with the cutting edge of which is adapted to cooperate a movable cutter $c$. The cutter $c$ is removably supported on a frame or box $d$, supported at its bottom by a relatively heavy spring $e$, against which bears the head of a pin $f$ extending from the bottom of frame $d$ and guided by passing through a cross member $a'$ of the main frame $a$. The spring $e$ is supported on a platform $g$ hung from the cross member $a'$ by means of bolts $g'$. The frame or box $d$ is guided and supported against lateral movement by guides $h$ engaging with suitable slides mounted on frame $a$. Within the frame or box $d$ is positioned a roller $i$, adapted to be engaged by a cam $j$ carried on a shaft $k$, supported in bearings in the main frame $a$ and passing through slots in the frame or box $d$. The shaft $k$ is constantly driven by any suitable means through suitable connections, as a belt, chain, or gearing.

The operation of the blanking mechanism will be readily understood if it be assumed that a strip of paper is fed over the die $b$, beneath the cutter $c$, and stopped, as will be hereinafter fully described. The shaft $k$ is continuously rotated and as the high point of the cam contacts with the roller $i$, the frame or box $d$, with the cutter $c$ supported thereby, is forced downwardly against the action of spring $e$, until the cutter cooperates with the edges of die $b$ to shear or cut a blank from the strip of paper. The blank, circular in form, is immediately acted on by the forming mechanism, after which the cam permits the frame or box and cutter to be raised by the spring $e$.

Forming or folding mechanism

The forming or folding mechanism utilizes, as an essential element, the body of the die $b$, which is provided with a central aperture the edges of which are recessed as at $l$ and cut away to form the faces $m$. Beneath the die $b$ and in line with the aperture therethrough is a female mold member $n$, suitably supported from the frame $a$ and shaped to receive the blank folded into cup form by the die $b$, as will be hereinafter described.

Figure 4:
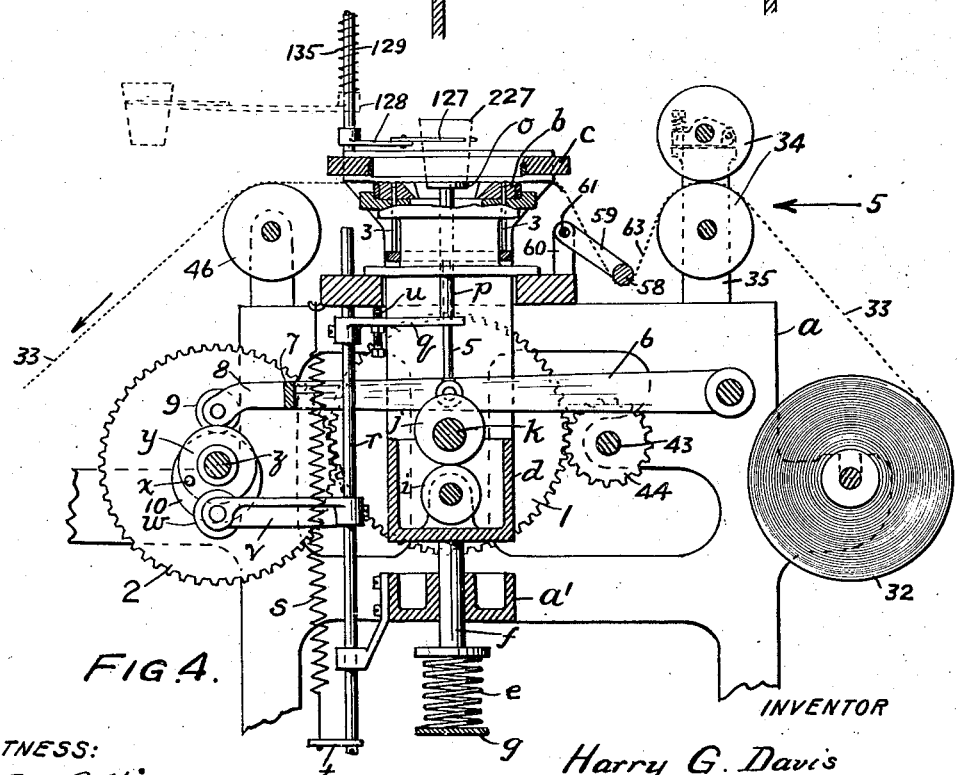
Fig. 4 is a sectional view, taken at right angles to the view shown in Fig. 1, showing the blanking and folding elements with a cup transfer and in association therewith the paper feed.

The bottom of the mold member $n$ is formed by a disc $o$, supported on the end of a vertical rod $p$, the lower end of which is secured to an arm $q$, adjustably mounted on a rod $r$, supported by frame $a$. A spring $s$ attached at one end to frame $a$ and at the other to an arm $t$ secured to rod $r$, serves to maintain the disc $o$ in raised position as determined by an adjustable stop $u$ carried by arm $q$ and adapted to contact with frame $a$, as shown in Fig. 4. An arm $v$ is adjustably secured to rod $r$ and carries a roller $w$ positioned in the path of a pin $x$, extending laterally from a disc $y$ secured on a shaft $z$, driven from shaft $k$ by means of gears 1 and 2. As will be observed from an inspection of Fig. 4, pin $x$ in contact with roller $w$ acts to lower rod $r$ and disc $o$ slightly, which, as will appear, momentarily withdraws disc $o$ from its upper position, in order to eliminate the possibility of interference with the paper when the feed operates.

Adjacent the inner ends of the recesses $l$ in the die $b$ are formed holes through which extend pins 3 secured at their lower ends to a collar 4, from opposite sides of which depend rods 5 pivotally attached to arms 6 which are in turn pivotally supported from the frame $a$, their free ends being connected by a cross member 7, from which extends an arm 8 carrying a cam follower 9 adapted to follow a cam 10 mounted on shaft $z$. The cam 10 serves to raise the pins 3 so that their ends project above the surface of die $b$ and permits the weight of collar 4 and of arms 6 to lower them.

Above the die $b$ and centrally of the aperture therethrough is a frusto-conical plunger 11 secured to the lower end of a vertical rod 12, mounted for reciprocation in a bearing member 13, supported on a bracket 14 mounted on frame $a$. The upper end of rod 12 is recessed and contains a spring 15, on which bears the enlarged lower end 16 of a rod 17, retained in the recess by means of a cap 18 secured to the end of rod 12 and through which the body of rod 17 freely passes. Links 19 are pivotally secured to rod 17 and to one end of a double lever 20, the other end of which is connected to a link 21, in turn connected to a vertical rod 22, supported from frame $a$, and adapted to be reciprocated by means of double acting cam 23 carried on shaft $k$. The reciprocation of rod 22 rocks lever 20, which effects the reciprocation of rod 17, which, through the spring 15 and the engagement of the enlarged lower end 16 of rod 17, effects the reciprocation of plunger 11, which in its descent engages disc $o$, depresses it against the action of spring $s$, passes through the apertures in die $b$, and enters mold member $n$.

Supported from a ring 24 centrally above die $b$ are a series of fixed blades 25 on the lower ends of which are formed wings 26. The blades correspond in number to the recesses $l$ about the apertures in die $b$ and the wings correspond to the surfaces $m$. The arrangement of the blades 25, wings 26, and recesses $e$ and surfaces $m$ is preferably such as to cause the exteriorly exposed edges of the pleats to extend (as indicated in Fig. 20) in a substantially vertical direction from the bottom to the top of the cup while the edges of the pleats of the interior surface of the cup extend (as shown in dotted lines in Fig. 20) in a direction inclined to the vertical.

The ring 24 is secured to the lower ends of a pair of rods 27, which pass through bracket 14 and are connected at their upper ends by a crosshead 28, having a frictional engagement with rod 17. A stop 29 is adjustably mounted on bracket 14 for engagement with ring 24 whereby its upward movement is limited, and rods 27 are provided with stops 30 for engagement with bracket 14, whereby the downward movement of ring 24 is limited. A stout wire post 31a may be mounted upon bearing member 13 and provided at its outer end with a hook from which a spring 33a may be suspended and attached to ring 24a to assist the upward recovery of blades 25 and their operating members.

Figure 3:
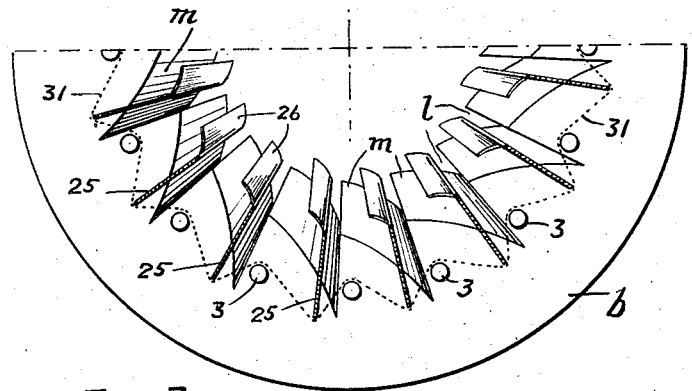
Fig. 3 is a partial plan view taken on line 3—3 Fig. 2.
Figure 2:
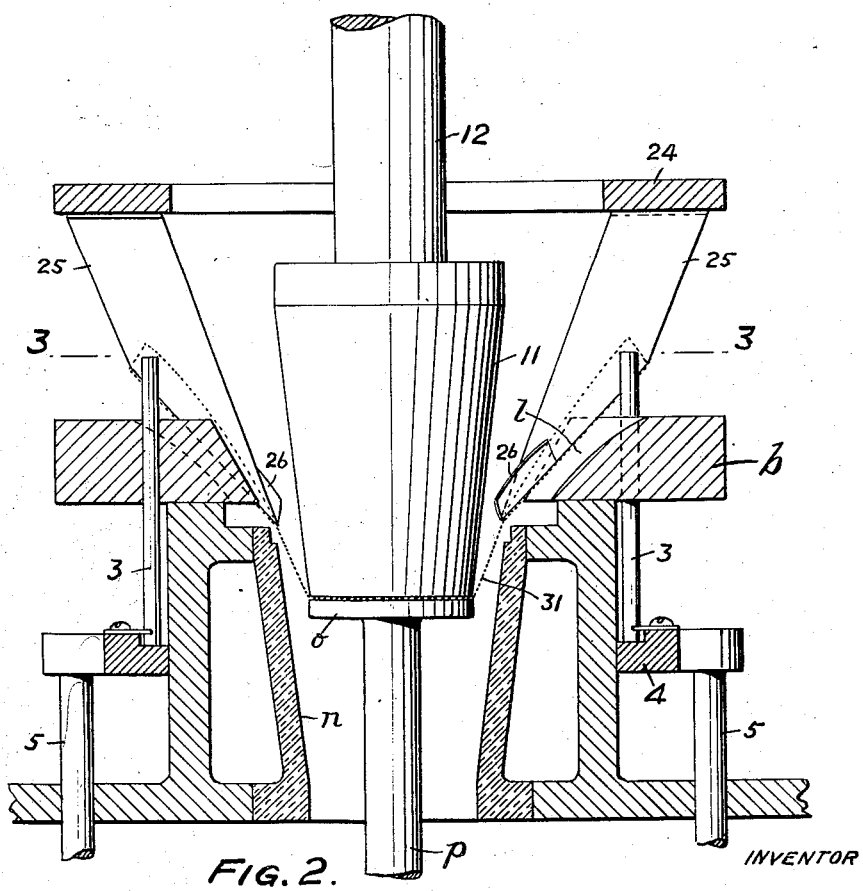
Fig. 2 is a detail sectional view of the folding device.

The operation of the forming or folding mechanism will be understood if it be assumed that a blank has been cut by the blanking mechanism and rests on die $b$. Plunger 11 descends and through the frictional engagement of crosshead 28 with rod 17 blades 25 descend with the plunger. In the descent of the plunger 11, the blank is gripped between its end and the disc $o$ and its central portion depressed through the aperture in die $b$. The descent of the blades 25 brings them into operative relation with the recesses and faces in the edge of the aperture in die $b$ and stops 30 contacting with bracket 14, prevent further descent of the blades. Through the operation of cam 10, the pins 3 are raised and act to fold in or, as it were, evenly distribute the outer portion of the blank between the blades, as indicated in Figs. 2 and 3 wherein the blank is indicated by dotted line 31.

The plunger 11 continuing to descend draws the blank between the blades 25 and wings 26 and the recesses $l$ and faces $m$, which act to establish folds or pleats in the blank and to form it into cup shape. Inasmuch as the action of forming the pleated cup is a drawing action through a fixed die, it will be apparent that the edges of the pleats which appear on the exterior of the finished pleated cup will extend up and down the side wall of the cup as if drawn on straight lines radially from the center of the bottom of the cup. The action of the means which form pleats in the cup is performed on the interior folds of the cup and causes the inner pleats to extend on lines which are not radial with respect to the center of the bottom of the cup, and the inner pleats (as indicated in Fig. 20) will diverge from the radial in the same general direction as the edges of the pleats at the lip of the cup when said lip is spun into a roll as hereinafter described. As the pleating operation is performed by the co-action of the blades 25, wings 26, recesses $l$ and faces $m$, the descending plug plunger 12 carries the formed blank into mold member $n$, between the wall of which and the plunger the pleats are flattened or pressed.

The plunger now ascends, through the action of cam 23, and the formed cup clamped to the plunger by disc $o$, under the influence of its spring $s$, is lifted out of the mold $n$. In the initial ascension of plunger 11, the blades 25 are lifted clear of die $b$, and until stop 29 engages ring 24, through the frictional engagement of crosshead 28 with rod 17. When disc $o$ reaches its upper limit, the continued ascension of plunger 11 withdraws the plunger from the cup, which remains seated on disc $o$, from which it is removed by a transferring device hereinafter described.

*Feeding and take-up mechanism*

Having described the structure and operation of the blanking and forming or folding devices, I will now proceed to describe the feeding and take-up mechanism which acts automatically to feed paper in a continuous strip to the blanking device and to take up the waste.

With particular reference to Figs. 4–9, the supply of paper is contained on a roll 32, revolubly mounted on suitable extensions of frame $a$. The paper in a strip 33 is led between a pair of rolls 34 mounted, in front of and adjacent the blanking and forming mechanism, on a bracket 35 and connected by gears 36, one of which is continuously driven by a pinion 37 on a shaft carrying a bevel gear 38 and connected to a spindle 39 by bevel gears 40. On the lower end of the spindle 39 is a friction disc 41 engaged by a friction wheel 42, on a shaft 43, driven from main shaft $k$ by gear 1 through a gear 44. The rolls 34 act to continuously withdraw paper from the roll 32 and to feed it continuously toward the blanking and forming mechanism.

Mounted behind the blanking and forming mechanism, as shown in Fig. 8, and supported by brackets 45, is a roll 46, with which are adapted to cooperate a pair of rollers 47 carried by arms 48 pivotally supported from extensions of brackets 45. The rollers 47 are yieldingly pressed into contact with roll 46 by means of springs 49, confined between the heads of bolts 50, which are screwed into the brackets 45, and lugs 51 extending from arms 48 and through which the bolts freely pass.

The roll 46 is adapted to be intermittently driven by a quadrant gear 52, mounted on frame a, which engages a gear 53 which is connected to roll 46 through a ratchet ball clutch 54. The quadrant gear is adapted to be oscillated by its connection with a crank 55, on shaft z, through links 56 and 57, the link 57 being attached to crank 55 by a slot and pin connection for adjustment. With oscillation of quadrant gear 52, it will be seen that gear 53 will be oscillated and through clutch 54 will revolve roll 46 in one direction intermittently.

The strip of paper 33 continuously fed by rolls 34 is of greater width than the blank cut by the blanking device and its continuity is not interrupted by the blanking. The strip passes between rollers 47 and roll 46, as clearly shown in Fig. 7, and while continuously advanced by rolls 34 is intermittently advanced by roll 46, which serves to position successive sections of the strip relative to the blanking die and cutter, for blanking; the strip remaining at rest during the formation of the cup by the forming device. Between the blanking device and rolls 34 is a roller 58 supported between the ends of a pair of arms 59, secured to a shaft 61, mounted in brackets 60, and upon one end of which is secured an arm 62. The roller 58 lies on the upper surface of the strip of paper fed by rolls 34 and during the inactivity of the roll 46 (in other words, during the blanking and forming operation while, though the rolls 34 are continuously feeding, the strip beyond the rolls is necessarily at rest) it acts to take up the paper fed by rolls 34 in a loop or bight 63, and maintain tension on the portion of the strip in the blanking device. In the arrangement described, the strip of paper 33 is continuously fed in the form of a web into the bight 63 and is intermittently advanced from said bight to the blanking and forming mechanism without interfering with the continuous feed of the web into the bight 63. In order to prevent excessive feed of the web toward the bight, a suitable mechanism is provided which, in the illustrated example of the apparatus, is automatically controlled by the bight itself to automatically vary the rate at which said web is fed into said bight. The illustrated form of the aforesaid mechanism will now be described.

The loop 63 is rapidly formed during the inactivity of roll 46 and is rapidly drawn out when roll 46 acts to advance the strip, so that the roller 58 is continuously raised and lowered at a rapid rate, resulting in oscillation of shaft 61 and swinging of arm 62.

Adjacent arm 62 is a rod 64 carrying spaced stops 65 and 66, said rod being secured at one end to an end of a link 67 so as to move therewith, the other end of said link 67 being pivotally secured to a lever 68, which has a forked end engaged with a collar 69 secured on shaft 43. Attached eccentrically to the end of shaft 43 is rod 70, supported by a bracket 71 and adapted to be reciprocated as shaft 43 revolves. Adjacent the upper end of rod 70 are a pair of stops 72 spaced vertically and horizontally one from the other.

Figures 5, 6:
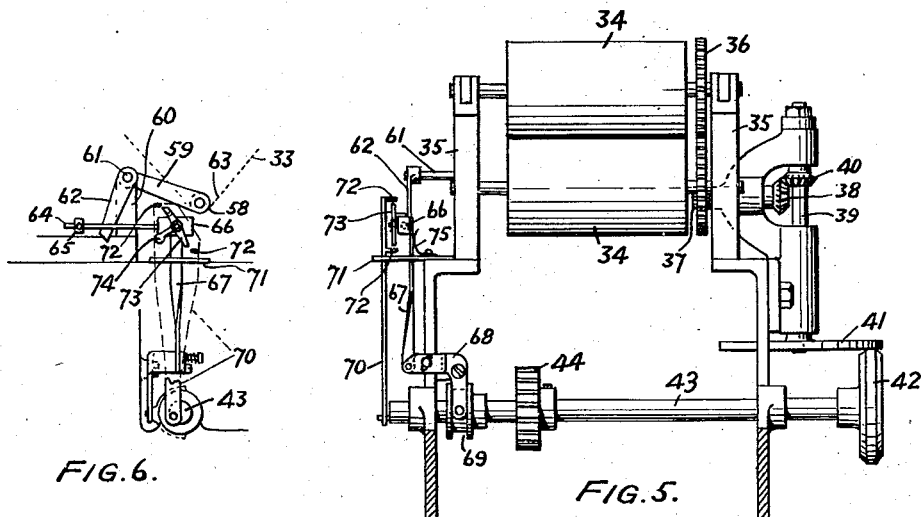
Fig. 5 is a sectional view taken in the direction of the arrow 5 Fig. 4.
Fig. 6 is a side elevation of a contiguous portion of Fig. 5.

Pivotally mounted on the outside of stop 66 is a double-ended stop 73, having a counterweight 74, adapted to tend to retain it in the position shown in Fig. 6. A spring 75, secured to the bracket 71, bears against the inside of stop 66.

The shaft 43 is so arranged as to be shifted transversely whereby the friction wheel 42 may be moved toward and away from the center of the friction disc 41, in order to slow up and again speed up the rollers 34.

As the roller 58 rises and falls through the taking out and formation of the loop or bight 63, the shaft 61 is thereby caused to be oscillated which effects oscillation of the arm 62 and, as has been shown, the rod 70 carrying stops 72 is constantly reciprocated through its eccentric connection to the end of shaft 43. If the rolls 34 are feeding slightly too much paper, the size of the loop formed will be such as to cause arm 62 to swing through an arc of such extent that before the loop is taken out by the intermittent action of roll 46, arm 62 will strike stop 65 moving rod 64 and with it the stop 66 to the left (Fig. 6) and positioning the upper end of double-ended stop 73 in the path of the upper stop 72, on rod 70. On the downward movement of rod 70, link 67 will be depressed through the engagement of stop 72 with stop 73, resulting in turning lever 68, which, through its connection with shaft 43, will cause the shaft to be moved to the right and move friction wheel 42 toward the periphery of disc 41 (see Fig. 5), with resultant slowing down of rolls 34 and decrease in the feed of the paper.

After slowing down, the rolls 34 will feed slightly too little paper and this condition is rectified by again speeding up the rolls, which is accomplished, when the loop is taken out, by the arm 62 hitting stop 66, which, through the previous movement of rod 64 to the left, will lie in the path of arm 62 when it is swung by the taking out of the loop. When arm 62 strikes stop 66, rod 64 is moved to the right, causing the lower stop 72 on rod 70 to contact with the lower end of stop 73, resulting in the upward movement of rod 70 in the raising of link 67 and movement to the left of shaft 43, which effects movement of friction wheel 42 toward the center of disc 41 and speeds up rolls 34, increasing the feed of the paper. The pivoted mounting of stop 73 permits stop 72 to pass freely in the inoperative movement of rod 70.

The strip 33, as it is withdrawn from the blanking device as a continuous strip, is scrap, which, after it passes from roll 46, is preferably taken up on a roll 76, mounted on a shaft 77 journalled in an extension of frame a. The roll 76 is rotated by the action of a spring 78 wound about shaft 77 adjacent one end and fastened to a collar 79 fixed on the shaft and to a pin 80 extending laterally from the side of a ratchet wheel 81 rotatably mounted on the shaft. The take up roll 76 for the web scrap together with its operating mechanism may, of course, be discarded, and the waste web fed directly into a container in front of the machine.

Loosely mounted on the shaft is an arm 82, which supports a pawl 83 in operative relation to the ratchet wheel 81 and to which is connected one end of a spring 84, the other end of which is attached to the frame a. Mounted on the frame a is a holding pawl 85 in operative relation with the ratchet wheel.

A rod 86 is pivotally secured at one end to arm 82 and is supported at its other end on a shaft driven by gearing from main shaft k, which passes through a slot formed in the rod. A cam 87, mounted on this shaft, is adapted to contact with a cam follower 88 on rod 86 and move it against the action of spring 84 which returns it, when the cam permits. When the cam actuates rod 86, the pawl 83 is backed on the ratchet wheel and when the spring 84 returns the rod the pawl engages and turns the ratchet wheel, which results in winding up spring 78, which, when its tension equals that of spring 84, prevents spring 84 from returning the rod. When roll 46 is actuated to feed the strip of paper, the spring 78 actuates roll 76 to take up the scrap fed by roll 46. Spring 78 is then rewound as above described and it will be noted, that, irrespective of the amount of scrap on roll 76, the spring 84 automatically acts to maintain the proper tension on spring 78 so that the scrap will be taken up as discharged.

*Finishing or spinning mechanism*

The finishing device serves primarily to firmly press the pleats of the cup formed in the forming device and serves at the same time as a tapping device to spin an edge or lip on the cup, and will be described more particularly with reference to Figs. 10–13.

The finishing device comprises essentially male and female members. The male member comprises a frusto-conical plunger 89 to which is secured a stem 90, which extends through a sleeve 91, having an enlarged head at its lower end, between which and the base of the plunger is positioned a ball bearing 92. The sleeve 91 extends through a casing 93 within which its enlarged head slidably fits and about the lower end of which is secured a collar 94, the lower edge of which extends below the base of plunger 89.

The sleeve 91 is provided adjacent its upper end with a collar 95 which bears on the top of the casing 93 and acts as a stop, while the stem 90 is provided with a collar 96 which bears on collar 95 and acts as a stop. Within casing 93 and about sleeve 91 is a coil spring 97, which bears at one end against the underside of the top of the casing and at the other on the enlarged head of the sleeve.

The casing 93 is attached to the upper end of a vertical rod 98, mounted in guides 99, by means of a clamping member 100. Rod 98 is adapted to be reciprocated, to raise and lower plunger 89, by means of a cam 101 mounted on a shaft z, and acting between a pair of cam followers 102 on a rod 103, mounted in guides 104, and connected by a link 15 to one end of a pivoted lever 106, the other end of which is connected to the lower end of rod 98 by a link 107.

The female member of the finishing device mounted within a fixed casing 108, comprises a female mold member 109 having an enlarged base and shaped internally complementary to plunger 89. The member 109 is mounted on the end of a vertical spindle 110, rotated by a gear 111 meshing with a gear 112 on a counter shaft, driven, through bevel gears 113 by a gear 2 on shaft z, by a pinion 114.

The shaft 110 and the member 109 supported thereby, in addition to being rotated, are intermittently raised and lowered by means of a vertical rod 115 having jaws engaging gear 111 and connected through a link 116 to a pivotally mounted lever 117 adapted to be rocked by means of a cam 118 on shaft z.

Within the member 109 is a disc 119 supported on a stem 120, which extends longitudinally through spindle 110 and is connected at its lower end to one end of a spring 122, the other end of which is attached to a member of the frame a. The spring acts to tend to maintain the disc in raised position, as shown in Fig. 10, against a stop 121.

Secured to the fixed casing 108 and extending above the upper edge of member 109 is a collar 124. The collar 94 on the casing 93 and the collar 124 have formed in their edges recesses 125, preferably semi-hexagonal in form and having spiral grooves or rifling 126 formed therein, as shown in Fig. 12. In other words, the collars 94 and 124 constitute members provided with annular recesses 125 adapted to be brought into juxtaposition to form a non-rotary annular lip-forming die preferably of hexagonal cross-section. The recess 125 in collar 94 is slightly wider than the recess 125 in collar 124, in order to provide an entrance to said die through which the edge of a cup is admitted to the die when the collars are brought together, as can be seen from an inspection of Fig. 11.

The operation of the finishing device will be understood if it be assumed that an unfinished cup 227 formed by the forming device is placed upon the disc 119, as shown in Fig. 10. The rod 98 descends, bringing down the male member of the device and the plunger 89 enters the cup, clamping its bottom against the disc 119. The plunger continues to descend, depressing the disc 119 against its spring 122 until the cup is bottomed in the member 109, which is rotating. When the cup is bottomed, the collar 94 will have been brought into contact with collar 124 and the semi-hexagonal recesses 125 in the edges of the collars will form a substantially closed hexagonal recess, a slight clearance being left to permit the edge of the cup to be entered in the recess.

When the cup is bottomed in the member 109, both the cup and plunger 89 will be revolved through the frictional engagement of the cup with member 109 and with the plunger.

The rod 115 is then raised through the action of cam 118 and the member 109, cup and plunger 89 against the action of spring 97, are lifted while being revolved. Lifting of the cup feeds its edge portion into the recess between the collars and the rotation of the cup causes the edge, the pleats of which are engaged by the spiral grooves 126, to be spun or rolled up into a tight roll. That is to say, the cup is shifted in the direction of its axis to feed its edge portion through the aforesaid entrance into the lip-forming die and is coincidentally rotated about its axis as the feed into the die takes place. As a result of this compound movement of the cup, the rifling 126 of the die in cooperation with the pleats of the cup resulting from the recited edge-producing instrumentalities will curl the edge portion thereof upon itself, progressively in a circumferential direction and at the end of the operation the die will exert an ironing or permanentizing action on the finished curled edge portion or lip of the cup. The finished lip is thus formed by curling the edge portion of the cup upon itself in circumferential progression and the finished lip presents the external appearance of being helically wound in a circumferential direction, this being due to the fact that the pleats, at said lip, are inclined with respect thereto, as indicated in Fig. 20 and that the direction of the effective spinning motion is the same as the direction of disposition of the pleats. The curl itself is not simply (as in prior cups) practically a series of adjacent rolls, each formed at the edge of one of the pleats of the cup body, but is of such a nature that the rolled-over portion of each cup pleat extends circumferentially toward the rolled-over portion of each adjacent pleat, so that splitting of the cup lip is thereby positively resisted. This has the further effect that any strain tending to unroll one of the pleat edges is resisted laterally by the adjacent pleat roll and held under an opposed elastic torsional influence tending automatically to reseat the opened or uncurled part of the pleat to which the opening strains have been applied.

These structural characteristics make it possible without splitting the lip of the cup, to subject it to a further mechanical action localized in any conventional manner to flatten the rolled edge so as to give it the general configuration of Fig. 21, whereby the cup gains the advantage of having an apparently thin, sharp flange-like lip, which, however, is structurally very rigid, permanent and agreeable.

After the edge of the cup is spun, the male member is raised and the disc 119 lifts the finished cup out of the member 109, positioning it for discharge, after which member 109 descends.

*Transferring mechanism*

The cup transfer device, as has been indicated, serves to transfer the cup from the forming device to the finishing device, that is to say, it picks up the cup from its position on disc *o* associated with the forming device (Fig. 4), after its formation, and transfers it and deposits it on disc 119 in association with the finishing device (Figs. 7 and 10).

The transfer mechanism illustrated in Figs. 7, 9, 10 and 15 comprises a pair of jaws 127, pivotally mounted at the end of an arm 128, in turn mounted on a vertical shaft 129, supported by a member of frame *a* and by a bracket 130. A crank 131 is secured to the shaft 129 and connected by a link 132 with one end of a pivoted lever 133 adapted to be rocked by a cam 134 on shaft *k*, whereby arm 128 will be oscillated to position the jaws 127 to receive a cup from the forming mechanism and to deliver a cup to the finishing mechanism. The shaft 129 is adapted to be reciprocated vertically in order to enable jaws 127 to lift the cup clear of the die *b* and cutter *c*, Fig. 4, and to lower it down on disc 119, Fig. 10. For this purpose, a spring 135 is placed on the shaft 129 and abuts against bracket 130 and the inner end of arm 128 and tends to move the shaft downwardly. The lower end of the shaft rests on a pivoted lever 136 adapted to be raised by a cam 137 on shaft *k*. Thus the shaft 129 and arm 128 are raised by the action of cam 137, lowered by the action of spring 135 and swung by the action of cam 134.

The jaws 127 are actuated for opening and closing to retain or release a cup through movement of a segmental gear 138 mounted on arm 128 and which engages one of a pair of gears 139 mounted respectively on the jaws 127. The gear 138 is moved by means of its connection through a link 140 to a crank 141 on a vertical sleeve 142, surrounding shaft 129, which is adapted to be oscillated by a cam 143 on shaft $k$, through the medium of a crank 144 connected by a link 145 with a pivoted lever 146 acted on by the cam.

In the operation of the transfer, the cams 134, 137 and 143 being properly timed, the arm 128 will be moved to the position shown in Fig. 7 with the jaws 127 fully open, the arm 128 resting against a stop 199. The jaws will then be closed by the cams 143 and engage the newly formed cup 227. The arm will then be lifted to raise the cup out of die $b$ and cutter $c$, by cams 137, and will then be swung to a position over the finishing device by cam 134. Cam 137 will then permit spring 135 to act to lower the arm and cam 143 will act to cause the jaws 127 to open and release the cup, which will then be positioned on disc 119. The transfer returns to the position in Fig. 7 in reverse manner.

*Discharge and counting mechanism*

The discharge device acts to remove the cups from the finishing device and delivers them to packages, or any other desirable receptacle, while the counting device serves to position successive packages or receptacles for the reception of a predetermined number of cups from the discharge device.

The discharge device illustrated in Figs. 13 to 16 comprises a runway 147, the bottom of which may be made hollow, as at 148, for the reception of steam, or other heating medium. A channel 149 is formed in one side of the runway and within the channel and adapted to slide therein is a slide 150 having a vertical extension 151. Pivotally mounted on the extension is a two-armed lever 152, the upper arm of which is attached to a bracket 153 which serves to support a bar 154, extending in parallelism with runway 147 and from which depends a pair of spaced flat fingers 155. A finger 156, preferably of resilient material, extends downwardly and beyond the end of bar 154 adjacent the finishing device. A link 165 is connected to bracket 153 and extension 151 in parallelism with the upper arm of lever 152. The lower arm of lever 152 extends between a pair of spaced stops 157 on slide 150 and is connected, by a link 158, to one end of a pivoted lever 159, the other end of which is connected by a link 160 to one arm of a bell crank lever 161 mounted on frame $a$. A second arm of bell crank lever 161 is connected, through a link 162, to a crank 163 extending laterally from a disc 164 mounted on shaft $z$. A spring 198 bears frictionally against slide 150 to insure independent movement of lever 152 between stops 157.

In operation, as shaft $z$ is rotated bell crank lever 161 is rocked and acts through link 160 to rock lever 159, which acts through link 158 to rock lever 152. Referring to Figs. 13 and 16, rocking of lever 152 in one direction will result in lowering bar 154 and entering finger 156 in the finished cup 200 resting on disc 119. When the bar reaches the desired lower position, the lower arm of lever 152 will strike one of the stops 157 and further rocking of the lever 152 will result in moving bar 154 lengthwise of the runway 147, causing the cup to be drawn off of disc 119 and onto the runway. The bar 154 is moved lengthwise a distance sufficient to move the outside finger 155 adjacent the end of the bar beyond the end of the runway, as shown by dotted lines in Fig. 13. The lever 152 is then rocked in the opposite direction and acts to raise the bar 154 to clear finger 156 from the cup. The lower arm of the lever then strikes the other stop 157 and the bar is moved lengthwise of the runway in raised position until the finger 156 is, as shown in Fig. 13, above a cup meanwhile lifted from the finishing device and resting on disc 119. The bar is again lowered by reversal of lever 152 and the finger 156 enters the cup on disc 119, while the first finger 155 enters the cup previously positioned on the runway by the finger 156. As will be clear, continuation of the movement of bar 154 results in a withdrawal of cups from disc 119 and a discharge of cups from the end of runway 147 there being at all times three cups exposed to view before final discharge, which enables the product to be inspected without handling.

*Packaging and counting mechanism*

The packaging and counting mechanism comprises a circular base member 166 and a circular top member 167 mounted in spaced relation upon a vertical shaft 168. A series of tubes 169 are secured in apertures formed in the top member and extend substantially below its under surface, while the bottom member is apertured adjacent its periphery in line with the tubes 169 for the reception of tappet members 170, having extensions passing through the apertures in member 166 and extending slightly below the under surface thereof. A box 171, adapted for the packaging of, for example, one hundred cups, is engaged with each of the tubes 169, its flap 172 being open, and rests on the tappet member 170. The shaft 168 is so positioned that by its rotation the upper ends of the tubes 169 may be successively brought adjacent the end of the runway 147, and as the cups are discharged therefrom by the movement of bar 154, they will fall into the tube so positioned and be guided thereby into the box 171, as shown in Fig. 13.

In order to provide for automatically rotating shaft 168 for the successive positioning of tubes 169 and boxes 171, after each box has received, for example, one hundred cups, a ratchet wheel 173 is mounted on shaft 168 and a pawl 174, in operative relation therewith, is mounted on an arm 175 revolubly mounted on shaft 168. A link 176 is connected at one end to the arm 175 and is supported at its other end on an end of a lever 177, which in turn is connected by a link 178 to an arm of a lever 179. The link 176 is retained in forward position by a spring 191 connected to the link and to a bracket 192. A spring 180 extends from a member of the frame a to a support 181 secured to link 178 and retains lever 177 raised, against a stop provided by an extension 182 thereof, and at the same time retains the end of the free arm of lever 179 in an advanced position in the path of a finger 183, extending from a ratchet wheel 184. Link 176 is notched, as at 185, and extends adjacent to the third arm of bell crank lever 161, heretofore referred to, in which, adjacent its end, is a laterally extending pin 186 which, when lever 161 is rocked in one direction while link 176 is retained in raised position, is moved to a position beneath notch 185 so that were link 176 lowered the pin 186 will engage in the notch 185 and in the reverse movement of lever 161, link 176 will be moved by the lever, causing pawl 174 to rotate shaft 168 sufficiently to position a fresh box beneath runway 147.

The link 176 is caused to be lowered by the contacting of finger 183, on ratchet wheel 184, with the free end of lever 179, which is turned thereby and effects the depression of the end of lever 177 against the action of spring 180, permitting the link 176 to drop by its own weight and engage with pin 186.

The ratchet wheel 184, having one hundred teeth, is mounted on a shaft 187 on which is mounted an arm 188, which supports a pawl 189 in operative relation with the ratchet wheel and which is connected with bell crank lever 161 by means of a link 190.

It will be noted that as bell crank 161 rocks in one direction, ratchet wheel 184 will be rotated, step by step, a distance of one tooth at a time and that once in each revolution of the wheel, finger 183 will contact with lever 179, causing pawl 175 to rotate shaft 168. It will also be noted that each time lever 161 rocks in one direction the bar 156 is actuated to deliver a cup into a tube 169. Therefore, when one hundred cups have been delivered, the shaft 168 will be turned to position a new tube 169 for the reception of cups. Upon the release of lever 179 by finger 183, spring 180 will act to cause lever 177 to lift link 176 and break the connection with lever 161. Spring 191 will then act to return link 176 to its forward position, which acts to back the pawl.

In order to effect a packing of the cups which nest into one another as they drop into box 171 and in order to avoid misalignment of the cups in the box, an arm 193 is pivotally mounted on bracket 192 and has its free end enlarged and extended to a point beneath the extended portion of the tappet member 170 serving to support a box beneath runway 147. A stop 194 limits the downward movement of the lever. A rod 195 slidably supported from bracket 192 is connected to bell crank 161 and is provided with an adjustable stop 196 adapted, in the reciprocation of rod 195 by lever 161, to strike a projection 197 formed on lever 193 and lift the lever, causing its free end to strike a blow against the tappet member 170. The striking of tappet member 170 causes the cups in box 171 to settle and pack to the desired degree.

*Operation of the apparatus*

From the foregoing description of the several elements comprised in the machine embodying my invention, it will be noted that the production of a paper vessel, as, for example, a drinking cup, is accomplished wholly automatically and without the necessity of handling of the vessel in the course of production and packaging.

In operation, a roll of paper in a continuous strip is provided and the strip 33 led between the continuously operating feed rolls 34 by which the strip is continuously fed toward the blanking and forming devices. The strip is intermittently fed to the blanking and forming devices by the operation of the roll 46. The paper fed by rolls 34 during the inactivity of the intermittently actuated roll 46 is taken up in the loop 63 by roller 58, which also acts to maintain tension on the portion of the strip in the blanking and forming devices.

The speed of the rolls 34 is varied through the shifting of friction wheel 42 as specifically described above.

After the roll 46 has operated to feed a section of the strip to the blanking and forming devices, the blanking device operates to cut out from the strip a circular blank which is then drawn through the forming device and pleated to form vessel 227 by means of plunger 11, blades 25 and pins 3, the pleats being pressed by the plunger in mold n. After the formation of the vessel, the plunger and blades are retracted and the vessel is lifted clear of the mold by disc o.

The vessel supported on disc o is engaged by jaws 127 on arm 128 and is transferred to the finishing mechanism. On removal of the vessel from disc o, the roller 46 acts to feed a fresh section of strip 33 to the blanking and forming device and during the feeding operation disc o is slightly lowered in order to clear the advancing paper.

In the advance of the strip, the waste left by the blanking device, which, it will be noted, is still a continuous part of the original strip, is taken up on roll 76, which is rotated by spring 78.

The vessel transferred by the arm 128 is positioned on the disc 119 of the finishing device. Plunger 89 is lowered and the vessel is engaged between the plunger and the mold member 109, which, as has been described, is rotated and lifted, and causes the cup to be rotated and lifted, with the result that its upper edge is forced into the recess 125 between the collars 94 and 124, which, when the plunger is entered in the mold, overlie one another. As the edges of the vessel enter the recess, the spiral grooves or rifling 126 engage the pleats of the vessel and as the vessel is lifted and turned, its edge is spun or rolled up, as illustrated at 201, Figs. 19 and 20, in which the finished cup 200 is shown. The action of the rifling is to cause the edges of the adjacent pleats as they start to form the rolled rim to take direction which will cause them to overlap in a direction at an angle to the radii of the cup or vessel (see Fig. 20) whereby a pleated paper vessel or cup is formed with an annular lip having angularly interlocked pleats. Due to the joint action of the rotating and upwardly moving mold 109, the recess 125 and the rifling, the aforesaid lip is formed gradually and circumferentially so that in the finished cup the circumferential formation of the lip (as shown in Fig. 20) is one in which the pleats overlap the interlock in a direction at an angle to the radii of the cup.

After the spinning of the edge of the vessel, the plunger 89 is retracted and the cup lifted clear of the mold by disc 119. The cup is then engaged by finger 156 on support 154 and drawn onto runway 147, along which it is advanced intermittently by the fingers 155. The cup, during its travel along the runway, may be readily inspected by the operator without handling and if desirable the runway may be heated in order to effect a drying and sterilization of the cup.

Adjacent the end of the runway are supported a plurality of vessel receptacles, which preferably are the containers or cartons in which the cups are to be finally packed. The cups intermittently advance along the runway and are intermittently discharged into one of the containers or packages and through the mechanism specifically described above, the containers are successively positioned to receive vessels from the runway after the discharge into each container of a predetermined number of vessels. As they are filled, the containers are removed and sealed up for shipment.

In the formation of the vessel as above described, the supply of paper contained on the roll 32 is preferably not dry, but premoistened, so that the paper fed to the blanking and forming devices is somewhat moist, in which condition I have found that it lends itself more readily to manipulation by the feeding mechanism and to the formation of the pleats by the forming device, the pleats may be more firmly consolidated by pressing in the mold n and the edge may be more nicely spun. Desired moisture may be applied before the supply of paper is placed on roll 32, or by any suitable means before it is fed to the forming mechanism. The amount of moisture in the completed vessels is negligible, but the vessels may be dried out if the runway 147 be heated as suggested.

Having now fully described my invention, what I claim and desire to protect by Letters Patent is:

1. In a machine for making paper vessels, in combination, blanking and forming devices, means for continuously advancing paper from a continuous strip, means for intermittently positioning portions of said strip for blanking, and means operating in harmony with said intermittent means for withdrawing the waste after the blanking in a continuous strip.

2. In a machine for making paper vessels, in combination, blanking and forming devices, means for continuously advancing paper from a continuous strip, means for intermittently positioning successive portions of said strip for blanking, means for taking up the portions of said strip advanced during the inactivity of said last mentioned means, and means operating in harmony with the intermittent means for taking up the waste after the blanking operation in a continuous strip.

3. In a machine for making paper vessels, in combination, blanking and forming devices, means for continuously feeding paper from a supply, means for intermittently feeding paper to the blanking device, means for taking up paper fed by said first mentioned means during the inactivity of said last mentioned means, and means controlled by said take-up means adapted to be actuated to vary the rate at which paper is fed by said first mentioned means.

4. In a machine for making paper vessels, in combination, blanking and forming devices, means for intermittently feeding paper to said devices, means for spinning a lip on a vessel formed by said forming device, means for transferring a vessel from the forming device to said spinning means, and means for removing vessels from said spinning means.

5. In a machine for making paper vessels, including blanking and forming devices, means for spinning a lip on a vessel formed by said forming device, and means for transferring a vessel from the forming device to said spinning means, the combination of means for supporting a plurality of containers, means for transferring vessels from the spinning means to a container, and means for operating said supporting means to position the containers successively for the reception of vessels.

6. In a machine for making paper vessels including blanking and forming devices, means for spinning a lip on a vessel formed by said forming device, and means for transferring a vessel from the forming device to said spinning means, the combination of means for supporting a plurality of containers, means for transferring vessels from the spinning means to a container, and means operatively controlled by said last mentioned transferrinng device for operating said supporting means to position the containers successively for the reception of vessels on the transfer of a predetermined number of vessels.

7. In a machine for making paper vessels, in combination, a die provided with an aperture the edge of which is cut away to form a plurality of recesses, blades adapted in their operative position to fit into said recesses and force a blank into the same, means independent of said blades and cooperating therewith to form the blank, a cutter adapted to cooperate with the edge of said die, means to intermittently feed paper to said die, means to actuate said cutter, and means for drawing a blank through said die.

8. In a machine for making paper vessels, in combination, a die provided with an aperture the edge of which is slotted and cut away to form a plurality of surfaces, blades adapted to cooperate with said surfaces, pins adapted to be extended above said die to cooperate with said blades, and means for drawing a blank through said die.

9. In a machine for making paper vessels, in combination, a die provided with an aperture the edge of which is cut away to form a plurality of surfaces, blades adapted to cooperate with said surfaces, pins adapted to be extended above said die to cooperate with said blades, a cutter adapted to cooperate with the edge of said die, means to feed paper to said die, means to actuate said cutter, and means for drawing a blank through said die.

10. In a machine for making paper vessels, in combination, a die provided with an aperture the edge of which is cut away to form a plurality of surfaces, blades adapted to be actuated to cooperate with said surfaces, a mold positioned beneath said die, a plunger adapted to be actuated to draw a blank through said die and enter it in said mold, means for actuating said plunger, means affording a frictional engagement between said blades and said plunger actuating means, whereby when said plunger is actuated said blades will be actuated and a stop for said blades.

11. In a machine for making paper vessels, in combination, a forming die, a mold positioned beneath said die, blades adapted to be reciprocated into and out of cooperative relation with said die, a plunger adapted to be reciprocated through said die into and out of said mold, means to reciprocate said plunger, means affording a frictional engagement between said blades and said plunger reciprocating means whereby when said plunger is reciprocated said blades will be reciprocated into and out of cooperative relation with said die, and stops adapted to fix the limits of reciprocation of said blades.

12. In a machine for making paper vessels, in combination, a forming die, a mold positioned beneath said die, a plunger adapted to be reciprocated to draw a blank through said die and enter into said mold, blades adapted to be actuated to cooperate with said die, pins adapted to cooperate with said blades, means adapted to clamp a blank to said plunger on its entry into said mold and eject the formed blank on its withdrawal therefrom, and means for actuating the several instrumentalities.

13. In a machine for making paper vessels, in combination, a blanking and forming die, a mold positioned beneath said die, a cutter adapted to cooperate with said die, means to feed paper intermittently in a continuous strip to said die, a plunger adapted to be reciprocated to draw a blank through said die and thereby form the blank and to carry said formed blank into said mold whereby the formation of the blank is completed, a member adapted to cooperate with said plunger to clamp the blank to said plunger, means to raise said member to lift a formed blank clear of said mold on withdrawal of said plunger, and means for lowering said member during the intermittent feeding of paper.

14. In a machine for making paper vessels, in combination, a blanking device, a forming device, means for the support of a supply of paper in a continuous strip, means for continuously withdrawing paper from the supply, means for intermittently feeding paper withdrawn from the supply to the blanking and forming devices, and means operating in harmony with said blanking devices for taking up the waste paper in a continuous strip.

15. In a machine for making paper vessels, in combination, a blanking device, a forming device, means for the support of a supply of paper in a continuous strip, means for continuously withdrawing paper from the supply, means for intermittently feeding paper withdrawn from the supply to the blanking and forming devices and withdrawing waste paper therefrom, and means for taking up the waste paper in a continuous strip.

16. In a machine for making paper vessels, in combination, a blanking device, a forming device, means for the support of a supply of paper in a continuous strip, means for continuously withdrawing paper from the supply, means for intermittently feeding paper withdrawn from the supply to the blanking and forming devices, means for taking up paper withdrawn from the supply during the inactivity of said feeding means, and means controlled by said last mentioned means for varying the rate of withdrawal of paper from the supply.

17. In a machine for making paper vessels, in combination, a blanking device, a forming device, means for the support of a supply of paper in a continuous strip, a pair of rolls, means including a pair of friction discs for driving said rolls to continuously withdraw paper from said supply, means for intermittently feeding paper to said blanking and forming devices, means for taking up paper fed from said supply during the inactivity of said feeding means, and means controlled by said last mentioned means whereby the relative position of said discs may be varied to vary the speed of said rolls.

18. In a machine for making paper vessels, in combination, a blanking device, a forming device, means for the support of a supply of paper in a continuous strip, a pair of rolls, means including a pair of friction discs for driving said rolls to continuously withdraw paper from said supply, means for intermittently feeding paper to said blanking and forming devices, means for taking up paper fed from said supply during the inactivity of said feeding means, means controlled by said last mentioned means whereby the relative position of said discs may be varied to vary the speed of the rolls, a roll adapted to receive waste paper from said blanking and forming devices, and tension means for rotating said roll when said feeding mechanism operates.

19. In a machine for making paper vessels, in combination with a vessel forming device and a vessel finishing device, of means for transferring a formed vessel from said forming device to said finishing device comprising an arm, means to swing said arm between said forming and finishing devices, a pair of jaws mounted on said arm, a gear mounted on each of said jaws, a gear in mesh with the gears on said jaws mounted on said arm, and means for oscillating said last mentioned gear whereby said jaws will be actuated to grip and release a vessel.

20. In a machine for making paper vessels, a topping device comprising a mold, a plunger adapted to be reciprocated into and out of said mold, collars having complementary recesses, means to reciprocate the plunger, and means to lift and rotate the mold when the plunger is entered therein whereby the edge of a vessel confined in the mold by the plunger will be forced between said collars and spun.

21. In a machine for making paper vessels, a topping device comprising a mold, a plunger adapted to be reciprocated into and out of the mold, a fixed collar positioned adjacent the mouth of the mold, a collar carried by the plunger adjacent its base and adapted to overlie said first mentioned collar when said plunger is entered in said mold, annular recesses formed in said collars, spiral grooves formed in said recesses, and means to lift and rotate said mold when said plunger is entered in said mold whereby the edge of a vessel confined in the mold by the plunger will be forced between said collars and spun.

22. In a machine for making paper vessels, a topping device comprising a mold, a plunger adapted to be reciprocated into and out of the mold, a fixed collar positioned adjacent the mouth of the mold, a collar carried by the plunger adjacent its base and adapted to overlie said first mentioned collar when said plunger is entered in said mold, annular recesses formed in said collars, spiral grooves formed in said recesses, means to lift and rotate said mold when said plunger is entered in said mold whereby the edge of a vessel confined in the mold by the plunger will be forced between said collars and spun, and means to raise a vessel clear of said mold when said plunger is withdrawn therefrom.

23. In a machine for making paper vessels, a discharging device comprising a runway, a support, a plurality of vessel-engaging members depending from said support means to move said support vertically whereby said members may engage and release a plurality of vessels, and means for moving said support longitudinally whereby vessels engaged by said members will be moved along said runway.

24. In a machine for making paper vessels, a discharging device comprising a runway, a support, vessel-engaging members carried adjacent the ends of said support, a vessel-engaging member carried intermediate the ends of said support, means to move said support vertically whereby said members may engage and release vessels, and means to move said support longitudinally whereby vessels engaged by said members will be progressively moved onto said runway at one end and off of said runway at the other end.

25. In a machine for making paper vessels, in combination, a vessel finishing device, a runway one end of which is adjacent the finishing device and the other end of which comprises a discharge end, a support, vessel-engaging members carried adjacent the ends of the support, a vessel-engaging member carried intermediate the ends of the support, means to reciprocate the support longitudinally of the runway to position the vessel-engaging members adjacent its ends over the finishing device and beyond the discharge end of the runway in alternate sequence and means to move the support vertically at its limits of longitudinal movement, whereby vessels will be progressively withdrawn from the finishing device and discharged at said discharge end of the runway.

26. In a machine for making paper vessels, in combination, a vessel finishing device, means for supporting a plurality of vessel receptacles, means for progressively transferring vessels from the finishing device to one of the receptacles positioned for the reception of vessels, and means controlled by the transferring means for operating said supporting means to position successive receptacles at periodic intervals for the reception of vessels.

27. In a machine for making paper vessels, including a blanking device, a forming device and a finishing device, the combination of means to transfer a partially finished vessel from the forming device to the finishing device, supporting means for a receptacle for finished vessels, and means to progressively discharge finished vessels into a receptacle positioned on said supporting means.

28. In a machine for making paper vessels, including a blanking device, a forming device and a finishing device, the combination of means to transfer a partially finished vessel from the forming device to the finishing device, supporting means for a plurality of receptacles for finished vessels, means to progressively discharge finished vessels from the finishing device to one of said receptacles positioned by said supporting means for the reception of vessels, and means for operating said supporting means to position successive receptacles at periodic intervals for the reception of vessels.

29. In a machine for making paper vessels, the combination of blanking and forming devices, continuously operating feeding mechanism for continuously feeding a web of paper into a bight, and intermittently operating mechanism for intermittently advancing the web from said bight to the blanking and forming devices and for maintaining it against a return movement into said bight, without interfering with the continuous feed of the web into the bight, and tension means effective upon said web in the bight thereof and cooperating with said intermittently operated mechanism for maintaining the web, under tension, in operative relation to said blanking and forming devices.

30. In a machine for making paper vessels, the combination of blanking and forming devices, continuously operating feeding mechanism for continuously feeding a web of paper into a bight, and intermittently operating mechanism for intermittently advancing the web from said bight to the blanking and forming devices and for maintaining it against a return movement into said bight, without interfering with the continuous feed of the web into the bight, and mechanism controlled by the bight of said web for varying the rate at which the web is continuously fed into the bight.

31. In a machine for making paper vessels, the combination of blanking and forming devices, feeding means for feeding a web of paper into a bight, mechanism, including a friction disc and a friction wheel, for continuously feeding said web into said bight, intermittently operated feeding means for intermittently advancing the web from said bight to said blanking and forming devices, without interfering with the continuous feed of the web into the bight, and means controlled by said bight whereby the friction wheel is shifted relatively to the friction disc to automatically vary the rate at which the web is continuously fed into the bight.

32. In a machine for making paper vessels, the combination of mechanism for forming a blank into a paper vessel, and means whereby the free edge of said vessel is spun in a helical direction progressively along its circumference to form a peripheral lip thereat.

33. In a machine for making paper vessels, the combination of mechanism for forming a blank into a paper vessel, a lip-forming die, and mechanism whereby said vessel is shifted in the direction of its axis to feed its edge portion into said die and coincidently rotated about its axis to spin said edge portion in a helical direction progressively along its circumference to form an annular lip on said vessel.

34. In a machine for making paper vessels, the combination of mechanism for forming a blank into a paper vessel, a pair of cooperating members having annular recesses adapted to be brought into juxtaposition to form an annular die, one of said recesses being wider than the other to provide an entrance to said die, and mechanism for shifting said vessel in an axial direction to feed its edge portion through said entrance into said die and for coincidentally rotating the vessel about its axis to cause said die to spin said edge portion in a helical direction progressively along its circumference to form a spirally wound lip on said vessel.

35. In a machine for making paper vessels, the combination of mechanism for forming a blank into a pleated paper vessel, a pair of cooperating members having annular recesses of semi-hexagonal form in cross-section adapted to be brought into juxtaposition to form an annular die of approximately hexagonal cross section, the one recess being wider than the other to provide an entrance to said die and the surfaces of both recesses being provided with rifling, and mechanism for shifting said vessel in the direction of its axis to feed its edge portion through said entrance into said die and for coincidently rotating the vessel about its axis to cause said rifling in cooperation with the pleats of said vessel to spin said edge portion in a helical direction progressively along its circumference to form a spirally wound lip on said vessel.

36. In a method of making pleated paper cups, those steps which consist in forming a pleated cup from a blank, curling the edge portion of said cup upon itself and, during said curling, overlapping adjacent pleats in a direction at an angle to the radii of the cup-like form, whereby a paper vessel is formed with an annular lip having angularly, interlocked pleats.

37. The method of making pleated paper vessels which consists in forming a paper blank into cup-like form having pleats on the sides thereof and then, simultaneously imparting to the formed blank axial and rotary motion whereby adjacent pleats overlap in a direction at an angle to the radii of the cup-like form and an annular lip having angularly, interlocked pleats is made on said cup-like form.

38. The method of making pleated paper vessels which consists in forming a paper blank into cup-like form having pleats extending in an approximately axial direction, then rolling over the lip-edge portion of the pleats and, during said rolling, overlapping, adjacent pleats in a direction at an angle to the radii of the cup-like form whereby a paper vessel is formed with an annular lip having angularly, interlocked pleats.

39. The method of making pleated paper vessels which consists in feeding a web of paper in a given direction, intermittently cutting a blank from said web, forming said blank into cup-like form having pleats on the sides thereof, and then, simultaneously imparting to the formed blank, axial and rotary motion whereby adjacent pleats overlap in a direction at an angle to the radii of the cup-like form and an annular lip having angularly, interlocked pleats, is made on said cup-like form.

40. The method of making pleated paper vessels which consists in feeding a web of paper in a given direction, intermittently cutting a blank from said web, forming and pleating said blank into cup-like form having pleats on the sides thereof, and then, simultaneously imparting to the formed, pleated blank, axial and rotary motion whereby adjacent pleats overlap in a direction at an angle to the radii of the cup-like form and an annular lip having angularly, interlocked pleats is made on said cup-like form, the last named operation being timed to take place during the period that succeeding blanks from the web are undergoing forming and pleating.

41. The method of making pleated paper vessels which consists in cutting successive blanks from temporarily arrested successive sections of a web of paper continuously moving in a direction toward the cutting station forming said cut blanks into cup-like form, having pleats extending in an approximately axial direction, then rolling over the lip edge portion of the pleats and, during said curling, overlapping adjacent pleats in a direction at an angle to the radii of the cup-like form whereby a paper vessel is formed with an annular lip having angularly, interlocked pleats.

42. In a machine for making paper vessels, in combination, a blanking device, a forming device, means for the support of a supply of paper in a continuous strip, a pair of rolls, means including a pair of friction discs for driving said rolls to continuously withdraw paper from said supply, thereby feeding the paper into a locality anterior of the blanking and forming devices, means for intermittently feeding paper to said blanking and forming devices, means in said locality for holding the paper taut as the same is fed during the inactivity of said feeding means, and means controlled by said last mentioned means whereby the relative position of the said friction discs may be varied to vary the speed of the rolls.

43. In a machine for making paper vessels, the combination of mechanism for forming a blank into a paper vessel, a lip-forming die, and mechanism whereby said vessel is shifted in the direction of its axis to feed its edge portion into said die and the vessel is coincidentally rotated about its axis to spin said edge portion in a helical direction progressively along its circumference to form an annular lip on said vessel, said die being immovable axially and circumferentially during the engagement of the cup lip therewith.

44. A machine for making pleated vessels from paper blanks, comprising means for folding the blank into pleated cup-like form in which the exteriorly exposed edges of the pleats extend in a vertical direction while the edges of the pleats of the interior surface of the blank extend in a direction inclined to the vertical and means for causing the edges of the thus pleated blank to be turned upon itself to form a thickened lip around the edge of the cup, said means including edge-producing instrumentalities having motion relative to each other and functioning to dispose the pleats in the rim portion in the same general direction defined by the inclination from the vertical of the edges of the pleats of the interior surface of the vessel.

45. In a machine for making paper vessels, in combination, a forming die having a surface adapted to receive a paper blank, a plurality of blades associated with said die and located below said surface, a plurality of pins positioned in alternated relation to said blades, means for reciprocating said pins upwardly from said surface, a mold positioned beneath said die, a plunger adapted to, and substantially limited to reciprocal motion for drawing a blank through said die between said alternated blades and projecting pins thereby forming the blank with overlapping pleats, and to carry said formed blank into said mold, whereby the formation of the blank is completed, and means adapted to clamp a blank to said plunger on its entry into said mold and eject the formed blank on its withdrawal therefrom.

46. In a machine for making paper vessels, the combination of a die having an aperture the edge of which is cut away to form a plurality of surfaces, blades adapted to cooperate with said surfaces to pleat a blank, means for drawing the blank through said die, and a set of upwardly movable pins disposed at substantially equal intervals from each other between said surfaces to cooperate with said blades to initially distribute the outer portions of the blank substantially evenly between successive blades and thereafter, in cooperation with said blades and said surfaces, during the drawing of the blank through said die, to cause uniform folding and pleating of the side walls of the paper vessel.

In testimony of which invention, I have hereunto set my hand at Philadelphia, Pennsylvania, on this 31st day of July, 1925.

HARRY G. DAVIS.